United States Patent [19]

Chamran et al.

[11] 4,329,051
[45] May 11, 1982

[54] SPECTROPHOTOMETER IMPROVEMENT OF IMPROVED AUTOMATIC WAVELENGTH INDEXING INITIALIZATION APPARATUS

[75] Inventors: Morteza M. Chamran, Elmhurst, Ill.; Larkin B. Scott, Fort Worth, Tex.; Paul B. Williams, Lombard, Ill.

[73] Assignee: The Perkin-Elmer Corporation, Norwalk, Conn.

[21] Appl. No.: 128,027

[22] Filed: Mar. 7, 1980

[51] Int. Cl.³ .............................................. G01J 3/28
[52] U.S. Cl. .................................................... 356/320
[58] Field of Search ............... 356/328, 332, 334, 320, 356/319, 330; 250/226

[56] References Cited

U.S. PATENT DOCUMENTS 3,433,557  3/1969  McPherson ..................... 356/334 X
3,868,499  2/1975  Aaronson et al. ............... 356/334 X
4,203,669  5/1980  Maeda et al. ........................ 356/332

FOREIGN PATENT DOCUMENTS 52-20046  2/1977  Japan ................................... 356/328

Primary Examiner—John K. Corbin
Assistant Examiner—Bruce Y. Arnold
Attorney, Agent, or Firm—E. T. Grimes; S. A. Giarratana; F. L. Masselle

[57] ABSTRACT

An improvement in a spectrophotometer of an improved apparatus for automatic initialization of the wavelength indexing function of the spectrophotometer. A drive mechanism drives the wavelength indexing movement of the spectrophotometer diffraction grating. The grating is initialized to a grating initialization position by physical opposition of a stop mechanism to the driving when a drive linkage reaches a drive linkage initialization position.

9 Claims, 5 Drawing Figures

SPECTROPHOTOMETER IMPROVEMENT OF IMPROVED AUTOMATIC WAVELENGTH INDEXING INITIALIZATION APPARATUS

RELATED PATENT APPLICATIONS

This application is related to the following four U.S. Patent Applications filed on even date herewith: (1) Ser. No. 128,029, entitled MANUAL WAVELENGTH ADJUSTMENT FOR A MICROPROCESSOR BASED SPECTROPHOTOMETER, by Larkin B. Scott, Morteza M. Chamran, and Paul B. Williams; (2) Ser. No. 128,030, entitled FILTER INDEXING FOR SPECTROPHOTOMETER SYSTEM by Morteza M. Chamran, Larkin B. Scott and Paul B. Williams; (3) Ser. No. 128,028, entitled SAFE MEMORY SYSTEM FOR A SPECTROPHOTOMETER, by Paul B. Williams, Larkin B. Scott and Morteza M. Chamran; and (4) Ser. No. 128,289, entitled A SPECTROPHOTOMETER SYSTEM HAVING POWER LINE SYNCHRONIZATION, by Morteza M. Chamran, Larkin B. Scott, Paul B. Williams and Michael A. Ford.

BACKGROUND OF THE INVENTION

This invention relates to a spectrophotometer, and more particularly, to an apparatus for automatic initialization of the wavelength indexing function of the diffraction grating of a spectrophotometer.

The accuracy and value of information gained from the utilization of a spectrophotometer are dependent upon initialization of the wavelength indexing function of the diffraction grating. In the past, automatic initialization has been accomplished with an apparatus having dual optical sensors and dual gear trains. Coarse positioning has been provided by one optical sensor and one gear train; fine positioning has been provided by the other sensor and gear train. While this apparatus has performed satisfactorily, precise control of the gear trains in response to the sensors has been necessary. Further, the two gear trains have required a slip clutch for independent, driving engagement with the diffraction and grating frequent calibration has been essential. Still further, an elaborate control mechanism has been necessary for automatic initialization after an abortive use of the spectrophotometer has left the grating in a non-normal ending position.

SUMMARY OF THE INVENTION

In a principal aspect, the present invention is the improvement, in a spectrophotometer having movable diffraction means for indexing and diffracting light, of an improved apparatus for automatic initialization of the wavelength indexing of the diffraction means to a diffraction means initialization position. The apparatus comprises a support structure, drive means, drive linkage means and driving stop means.

The drive means is for driving the movement of the movable diffraction means to the diffraction means initialization position. The drive means is mounted on the support structure.

The drive linkage means is for linking the drive means to the movable diffraction means. Through the drive linkage means, the diffraction means is moved in response to the drive means. The drive linkage means is movably mounted on the support structure, and linked to the other two means. The drive linkage means is thereby in a drive linkage means initialization position when the diffraction means is in the diffraction means initialization position.

The driving stop means is for stopping the drive means in response to the drive linkage means. The driving stop means is mounted on the support structure. The drive means is stopped in response to movement of the drive linkage means to the drive linkage means initialization position by physical, mechanical opposition of the driving stop means to the driving of the drive means.

In another principal aspect, the present invention is an apparatus as described above further comprising sensing means and controller means. The sensing means is mounted on the support structure for sensing the driving of the drive means and producing a signal while the driving means is driving. The controller means is for controlling the initialization.

The controller means is operably connected to the drive means and the sensing means. The controller means commands the drive means, and receives the signal of the sensing means. The controller means initiates initialization by command to the drive means and continues initialization by maintaining the command while the signal is being received. When the signal ceases, the command is terminated and initialization is completed.

Thus, it is an object of the present invention to provide an improvement in a spectrophotometer of an improved apparatus for automatic initialization of the wavelength indexing function of the diffraction grating of the spectrophotometer.

Another object of the present invention is to provide an improvement in a spectrophotometer of an indexing initialization apparatus that provides precise initialization without the precise control required of the known prior art apparatus.

Another object of the present invention is to provide an improvement in a spectrophotometer of an indexing initialization apparatus that has no slip clutch and thereby has a long life without the maintenance and repair required by the inclusion of a slip clutch.

Another object of the invention is to provide an improvement in a spectrophotometer of an indexing initialization apparatus that utilizes the wavelength indexing function via a mechanical stop.

A further object of the present invention is to provide an improvement in a spectrophotometer of an indexing initialization apparatus which has a single optical sensor and a single gear train or drive linkage to eliminate the complexity of structure, calibration and control of an apparatus having dual sensors and gear trains.

A still further object of the present invention is to provide an improvement in a spectrophotometer of an indexing initialization apparatus that initializes the indexing accurately without regard to the position of the diffraction grating prior to initialization.

BRIEF DESCRIPTION OF THE DRAWING

The preferred embodiment of the present invention is hereinafter described with reference to the accompanying drawing. The drawing consists of five figures, briefly described as follows.

DETAILED DESCRIPTION OF THE PREFERRED EMBODIMENT

Figure 1:
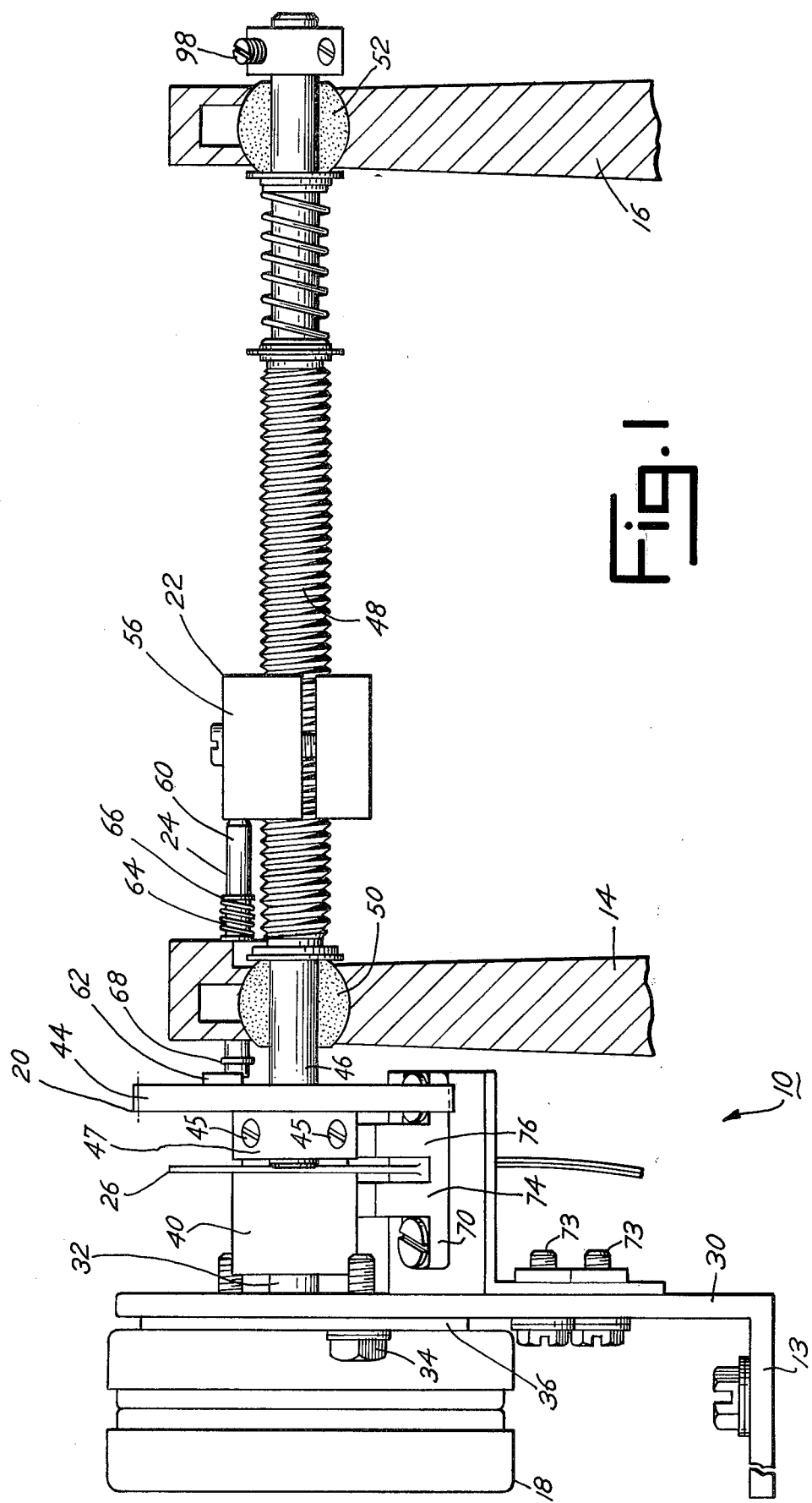
FIG. 1 is a side elevation view of the preferred embodiment of the present invention.
Figure 2:
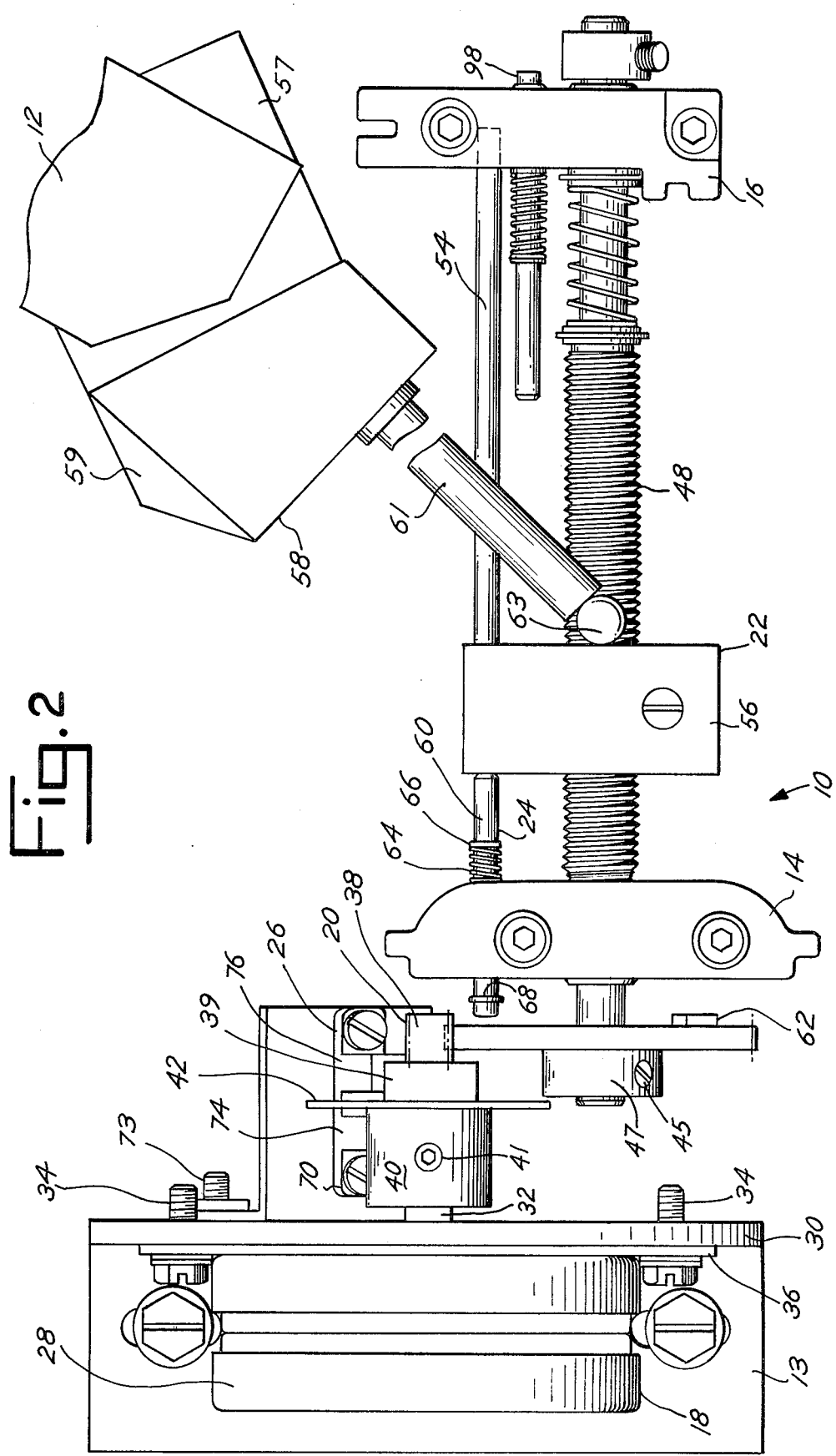
FIG. 2 is a top plan view of the preferred embodiment of the present invention.
Figure 3:
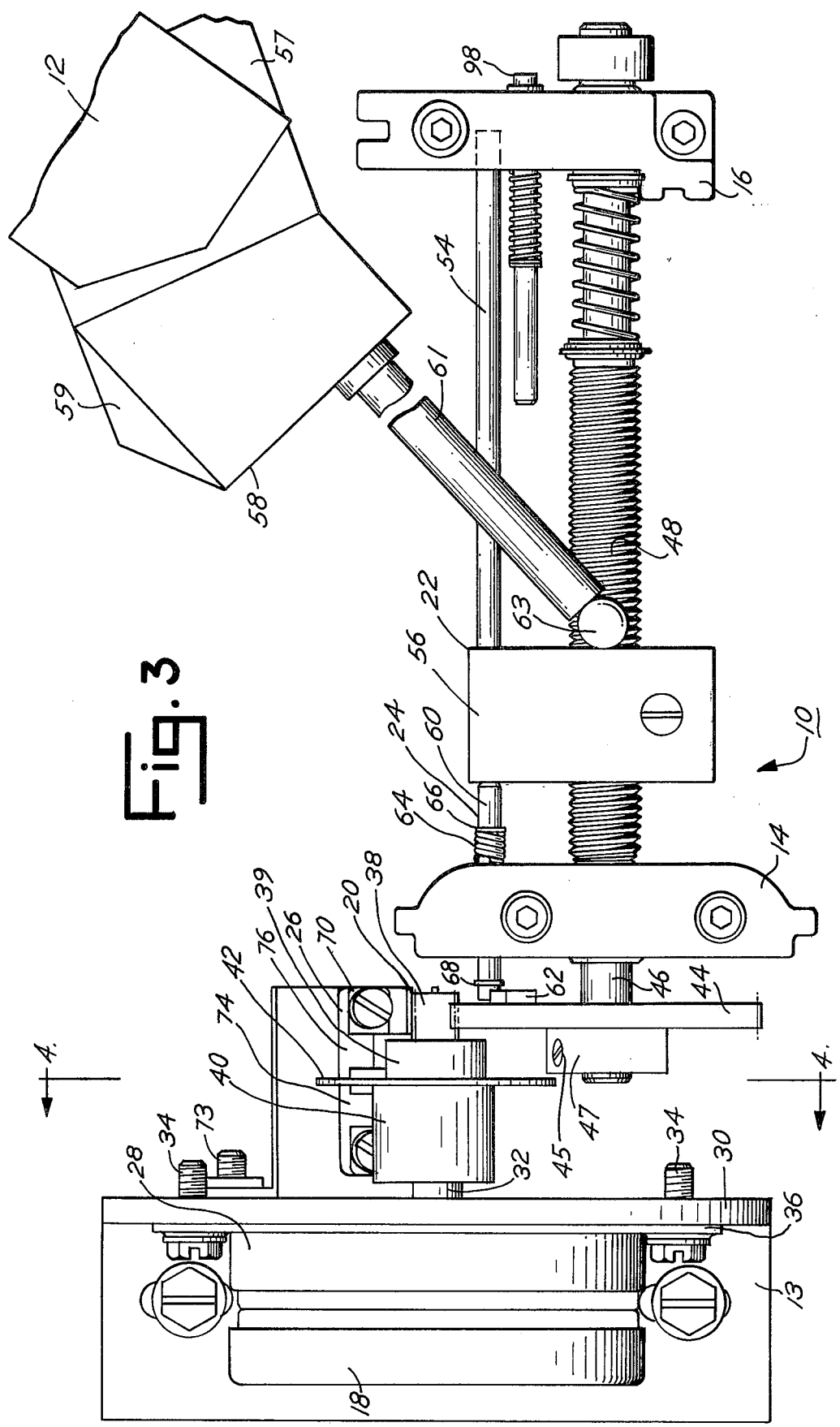
FIG. 3 is a top plan view of the preferred embodiment of the present invention, similar to FIG. 2, in the positioning of initialization.

Referring to FIGS. 1-5 of the accompanying drawing, the preferred embodiment of the present invention is an apparatus 10 for initialization of the wavelength indexing function of the diffraction grating 12 of a spectrophotometer, shown in FIGS. 2 and 3. The apparatus 10 includes, briefly, a base 13, two bearing supports 14, 16, a linkage support (not shown) a motor 18, a gear train 20, a drive linkage 22, a stop mechanism 24, a sensing mechanism 26 and a controller 82.

The base 13, linkage support and bearing supports 14, 16 comprise a support structure. The base 13 supports the motor 18 and sensing mechanism 26. The linkage bearing supports 14, 16 support the drive linkage 22. The base 13 and supports 14, 16 co-operatively support the gear train 20 and the stop mechanism 24.

The motor 18 and gear train 20 comprise a drive means for driving the diffraction grating 12. A housing 28 of the motor 18 is attached to an upstanding flange 30 of the base 12, with a shaft 32 of the motor 18 extending through a motor shaft opening (not shown) in the flange 30.

The shaft 32 is aligned along a first horizontal axis, and extends toward the linkage 22, or to the right as seen in FIGS. 1 and 2. Attachment of the housing 28 is made by machine bolts 34, which extend through threaded bolt openings (not shown) in a motor housing flange 36 of the housing 28 and the upstanding flange 30 of the base 12.

A pinion gear 38 is attached to the outer end of the motor shaft 32, adjacent an interrupter disk 42 as hereinafter described, for rotation with the pinion gear 38. The pinion gear 38 and disk 42 have motor shaft collars respectively 39, 40 through which fasteners such as screw 41 are set. The motor 18 thus drives the pinion gear 38. The motor 18 is a conventional electromechanical stepper motor, which drives in partial revolutions or steps of the shaft 32, in response to electrical phasing pulses supplied to the motor coils (not shown). The motor 18 drives in either direction of revolution of the shaft 32. As most preferred, the stepper motor 18 half-steps to provide a resolution of 7.5 degrees of revolution of the shaft 32.

The pinion gear 38 meshes with a drive member or drive gear 44. The motor 18 thus drives the drive gear 44. The gear ratio of the gears 38, 44 is relatively high. As a result, the motor 18 is a low torque motor.

The drive gear 44 is mounted upon an outboard portion 46 of a linkage member or drive shaft 48 of the drive linkage 22. Fasteners 45 are set through a collar 47 of the gear 44. The drive shaft 48 extends from the drive gear 44 in a direction away from the motor 18 along a second horizontal axis. The first and second horizontal axes are horizontally offset from each other. The drive shaft 48 is rotatably supported by the bearing supports 14, 16, within bearings 50, 52. The supports 14, 16 are horizontally spaced along the drive shaft 48, with the support 14 being an inner support adjacent the gear 44 and the support 16 being an outer support.

A guide shaft 54 parallels the drive shaft 48. The guide shaft 54 extends between and into the supports 14, 16. As in FIG. 2, the guide shaft 54 is aligned along a third axis horizontally offset from the axis of the drive shaft 48 in the direction of the axis of the motor shaft 32.

Another linkage member or guide member 56 is mounted on the shafts 48, 54. The guide shaft 54 has a smooth, cylindrical surface and the guide member 56 defines a cylindrical, internal guide shaft passage (not shown) for free passage of the guide shaft 54. The guide member 56 is thus slidably mounted on and guided by the guide shaft 54. The drive shaft 48 has an externally threaded portion between the supports 14, 16 on which the guide member 56 is mounted; the guide member 56 defines an internal drive shaft passage (not shown) and has internal threads therealong. The threads of the drive shaft 48 and guide member 56 mate. The threads thus comprise means for the mounting of the guide member 56 upon the drive shaft 48 for axial movement of the member 56 along the shaft 48, in response to rotational movement of the shaft 48. The motor 18 thus drives the drive member 56.

The shafts 48, 54, the guide member 56 and a drive link 58 comprise the drive linkage 22, and link the drive means to the diffraction grating 12. The drive link 58 is shown only in FIGS. 2 and 3 for clarity of FIG. 1. The drive link 58 includes a grating mounting portion 57, a pivot portion 59, an elongated, cylindrical body portion 61 and a substantially spherical rider portion 63. The body portion 61 extends horizontally from the pivot portion 59 toward the guide member 56. The rider portion 63 forms the end of the link 58 toward the guide member 56. The pivot portion 59 is pivotably mounted to the linkage support for pivoting movement about a centrally located, substantially vertical pivot axis. The link 58 is spring biased so that the rider portion 63 is pressed against the guide member 56. The positions of the link 58 and the grating 12 are thus controlled by the position of the guide member 56, and the driving of the motor 18 drives the grating 12 through its wavelength indexing movement.

As seen by comparing FIGS. 2 and 3, the grating 12 is movable to and from a diffraction grating initialization position as shown in FIG. 3. When the grating 12 is in the diffraction grating initialization position, the drive member 56 is in a position which is a drive linkage means initialization position.

The stop mechanism 24 is principally comprised by a first stop member or stop shaft 60 and a second stop member or stop tab 62. The stop shaft 60 is slidably mounted on the bearing support 14 for sliding, axial movement or shifting to and from a stop means initialization position, as in FIG. 3. The stop shaft 60 extends along a fourth horizontal axis. The fourth axis is parallel to the first, second and third axes, vertically aligned with the third axis and spaced above the third axis. The positioning of the fourth axis places the stop shaft 60 in the path of movement of the guide member 56 and closer to the second axis than the gear teeth and outer edge of the drive gear 44.

The stop shaft 60 is shifted to the stop means initialization position by the guide member 56, and biased away from the stop means initialization position by a helical spring 64. The spring 64 is located on the stop shaft 60 between the support member 14 and an external flange 66 on the stop shaft 60. As the guide member 56 moves to the drive linkage means initialization position, the member 56 contacts the shaft 60 and moves it against the bias of the spring 64 to the stop means initialization position. As the member 56 moves away from the drive means initialization position, the spring 64 moves the stop shaft 60 away from the stop means initialization position. A second external flange 68 on the stop shaft 60 opposite the flange 66 retains the shaft 60 on the support 14.

The stop tab 62 is positioned on the drive gear 44, at a distance from the second axis equal to the distance of the stop shaft 60 from the second axis. When the stop shaft 60 is in the stop means initialization position, the stop shaft 60 and the stop tab 62 physically contact each other. The stop mechanism 24 thus comprises a means for opposing the drive means by physical or mechanical opposition to the driving action thereof.

The sensing mechanism 26 senses the physical opposition of the stop mechanism 24. As shown best in FIG. 4, the mechanism 24 includes the disk 42 previously identified and a sensor 70. A sensor support bracket 72 is mounted on the upstanding flange 30 of the base 13 by bolts 73. The bracket 72 extends alongside the disk 42. The sensor 70 is mounted atop the bracket 72.

Figure 4:
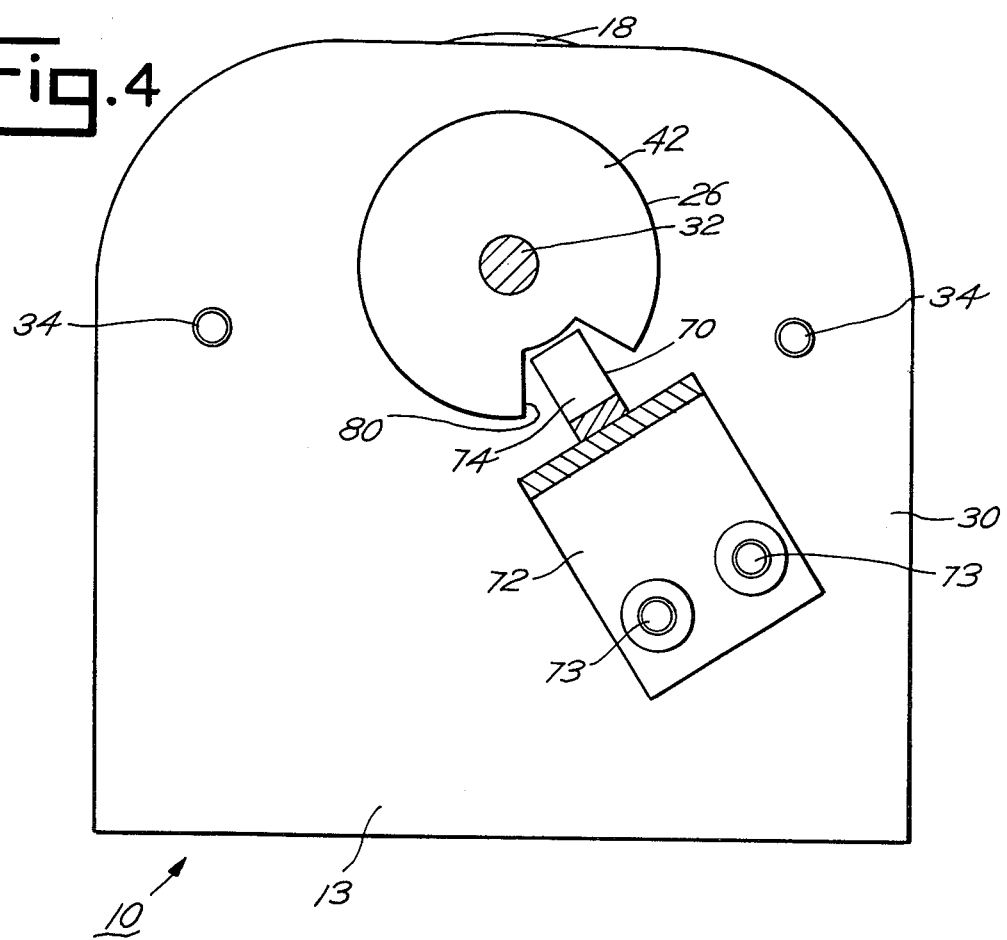
FIG. 4 is a cross-section view of the preferred embodiment of the present invention taken along line 4—4 of FIG. 3.

The sensor 70 includes an optical emitter 74 and an optical receiver 76. The emitter 74 emits an optical emission along a path of emission and the receiver 76 is located along the path of emission to receive the emission. Referring to FIG. 4, the disk 42 is generally circular and defines a circumferentially extending window or notch 80. The disk 42 is positioned so that the window 80 is rotatable into and out of registry with the path of emission. The disk 42 is thus a sensed member of the sensing mechanism 26, and interrupts the emission to the receiver 76 when the window is out of registry with the path of emission. The window 80 is in registry with the path of emission when the stop shaft 60 and the stop tab 62 are in contact with each other.

The receiver 76 is an optical/electrical transducer producing a digital signal. In response to receipt of the emission, the receiver 76 produces a "high" or "1" electrical signal; in response to non-receipt of the emission, the receiver 76 produces a "low" or "0" signal.

Figure 5:
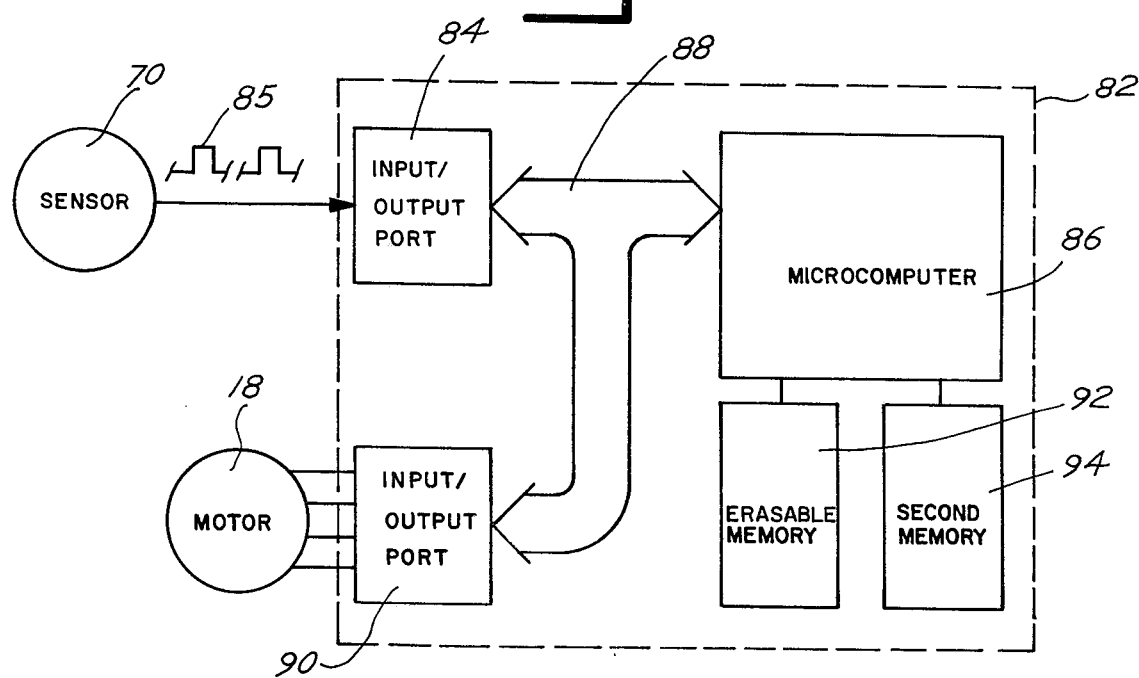
FIG. 5 is a block diagram of the preferred embodiment of the present invention.

Referring to FIG. 5, an input/output port 84 of the controller 82 receives the signal 85 of the sensor 70. The controller 82 includes a microcomputer 86 connected via a data bus 88 to the port 84 and to another input/output port 90. The motor 18 is connected to the port 90. Commands, or pulses, are supplied to the motor 18 via the port 90.

The controller 82 initiates or begins initialization of the wavelength indexing function of the grating 12 through the microcomputer 86 beginning a command to the motor 18 to drive in a forward direction. The motor 18 responsively moves the guide member 56 toward the inner bearing support 14 and thereby rotates the disk 42. As a result of the movement of the disk 42, the port 84 receives a pulsed signal from the sensor 70 in a pattern of a brief high signal followed by an extended low signal.

The microcomputer 86 samples the port 84 at timed intervals equal to the time interval for a partial revolution, e.g., one-forty-eighth revolution, of the disk 42. A high sample is recognized by the microcomputer 86, which initiates a count of high samples in an erasable memory location 92 whenever a first high sample i.e., a no-count, after a low sample is received. The high sample count is compared after each high sample to a stored count value in a second memory location 94. The stored count value equals the total number of high samples occuring during a rotation of the window 80 past the sensor 70, into and then out of register with the path of emission. A high sample count greater than the stored count value occurs only when the stop shaft 60 strikes the stop tab 62. The microcomputer 86 acts upon the greater high sample count by terminating the forward-drive command to the motor 18. The guide member 56 is now in a position for initiating a reverse-drive command. The reverse-drive command initiates the indexing function, driving the guide member toward the outer bearing support 16. During initialization the microcomputer 86 acts upon a low, i.e., a no-count sample after a high sample, when the high sample count does not exceed the stored count value, by resetting the erasable memory location 92 and maintaining the forward-drive command to the motor 18. The pattern from the sensor 70 thus constitutes a signal for maintenance of the initialization function, and the greater high sample count constitutes an end of the signal.

The controller 82 also controls the maximum duration of the indexing function by terminating the reverse-drive command when a stop mechanism 98 causes a high sample count greater than the stored count value. The mechanism 98 is substantially identical to the mechanism 24, and the indexing termination occurs substantially as does the initialization.

As should now be apparent to a person skilled in the art of spectrophotometry, the present invention and the manner and process of making and using it have been described in such full, clear, concise and exact terms as to enable any person skilled in the art to make and use the same. Further, the best mode contemplated by the inventors of carrying out their invention is set forth. To particularly point out and distinctly claim the subject matter regarded as invention, the following claims conclude this specification.

What is claimed is:

1. In a spectrophotometer having movable diffraction means for diffracting light the improvement, of an apparatus for initialization of the wavelength indexing function of the diffraction means to a diffraction means initialization position, comprising:
   drive means for driving the wavelength indexing movement of the diffraction means;
   stop means for stopping said drive means;
   sensing means for sensing the driving of the drive means and producing a signal while the drive means is driving; and
   controller means for controlling the initialization, the controller means being operably connected to the drive means to command the drive means and operably connected to the sensing means for receiving the signal, the controller means initiating initialization by command to the drive means to drive, continuing initialization by maintaining the command while the signal is being received and concluding initialization by terminating the command to the drive means when the signal ceases.

2. An improvement as in claim 1 in which said computer includes means for counting said optical pulses and means for comparing said count with a stored count to determine when the initialization is complete.

3. An improvement as in claim 2, wherein said computer includes means for terminating electronic pulses to said drive means when said initialization determination is complete.

4. A method of computer controlled initialization comprising initiating a command causing a motor to drive a wavelength indexing mechanism forwardly until arrested by a mechanical stop;

concurrently sampling in time sequence optical signals from said mechanism;

processing said optical signals by comparison means to ascertain when said mechanism has come to rest; and terminating forward drive and establishing a predetermined wavelength indexing sequence when said mechanism is ascertained to have come to rest.

5. An improvement as in claim 3 in which the sensing means includes an optical sensor.

6. An improvement as in claim 5 in which the optical sensor includes an optical emitter for emitting light along a path of emission and an optical receiver located along the path of emission for receiving light from the optical emitter.

7. An improvement as in claim 6 in which the sensing means further includes a sensed member defining a window, the sensed member being mounted on the drive means and intersecting the path of emission between the optical emitter and the optical receiver and being movable by the drive means to bring the window into and out of the path of emission so that the optical receiver receives optical pulses from the optical emitter and the optical receiver senses optical pulses.

8. An improvement as in claim 7 in which the drive means includes a shaft rotatably mounted on a support structure and the sensed member is a disk mounted on the shaft.

9. An improvement as in claim 8 in which the controller means comprises a computer and the optical sensor is an optical/electrical transducer.

* * * * *